250-203
250-203.R 56

Sept. 9, 1958 C. K. STEEL 2,850,939

ADJUSTMENT MEANS FOR OPTICAL ELEMENT

Filed March 6, 1950

INVENTOR:
COLLIS K. STEEL

BY Herbert E. Metcalf
HIS PATENT ATTORNEY

United States Patent Office 2,850,939
Patented Sept. 9, 1958

2,850,939

ADJUSTMENT MEANS FOR OPTICAL ELEMENT

Collis K. Steel, Hawthorne, Calif., assignor to Northrop Aircraft, Inc., Hawthorne, Calif., a corporation of California Application March 6, 1950, Serial No. 147,863

1 Claim. (Cl. 88—1)

My invention relates to centering devices, and more particularly to a centering device for use in an optical system in order that a scanning disc can be accurately centered, for example.

In an optical star tracking system, a scanning disc may be placed and rotated in the focal plane of the system in order that the sense and amount of deviation of a star image can be determined accurately. In order to obtain maximum accuracy, the scanning disc must be accurately centered. To that end adjusting means must be provided so that the disc can be centered while at all times maintaining a position within a plane perpendicular to the axis of rotation of the disc. It is an object of the present invention to provide such a device.

Briefly, the invention includes the use of a rotating member having a flat surface exactly perpendicular to the axis of rotation. An optical element, with a corresponding flat surface is mounted to be moved over the flat surface of the rotatable member under the control of a bezel ring positioned by lateral adjustment screws. This bezel ring is shaped to cause the optical element to be held firmly against the rotatable flat surface during lateral adjustment.

My invention can be more fully understood by reference to the drawings in which.

Figure 1:
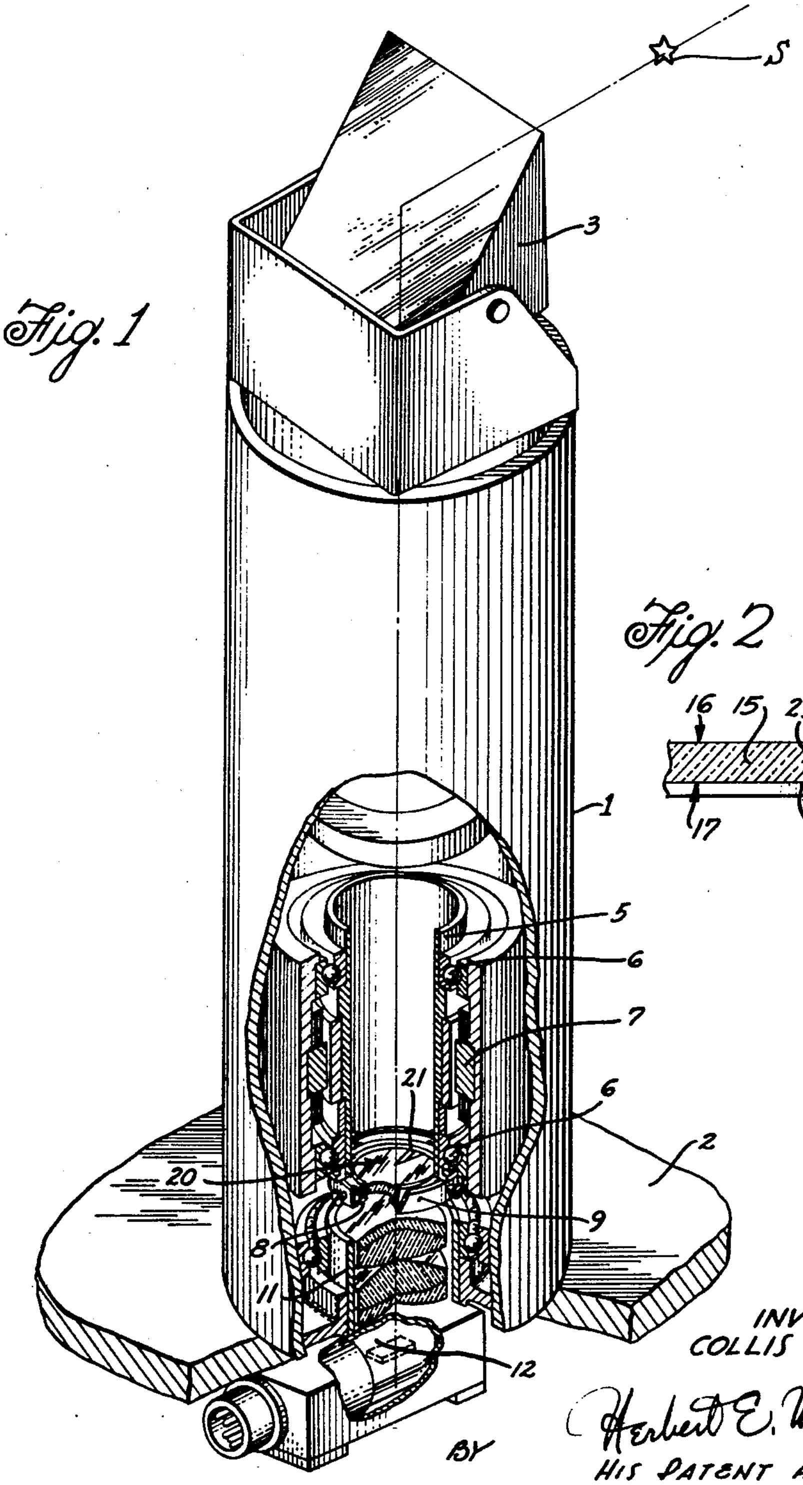
Figure 1 is a perspective vertical view partly cut away and sectioned to show the position in an optical star tracking system of a preferred form of the present invention.

The optical system illustrated in Figure 1 is no part of the present invention, being shown, described and claimed in the prior filed application of Ostergren et al., Serial No. 81,222, filed March 4, 1949.

This particular optical system comprises an outer casing 1 mounted on a foundation 2 and holding at the top thereof a prism 3 movable in azimuth and elevation to follow a star S, for example.

Inside casing 1 is a longitudinal hollow motor rotor 5 rotating on bearings 6 inside a motor stator 7 fastened to casing 1. At the lower end of the rotor 5 is positioned an apertured metal member 8 having a circular rim 9 and an apertured flat disc mounting surface 10 (see Figure 2); this latter surface being accurately machined to be perpendicular to the axis of rotation of the rotor 5. This axis in this instance coincides with the axis of an optical system including the prism 3 and upper lenses not shown.

Below the metal member 8 are positioned lower lenses 11, transmitting light passing along the axis of the optical system to a photocell 12.

Figure 2:
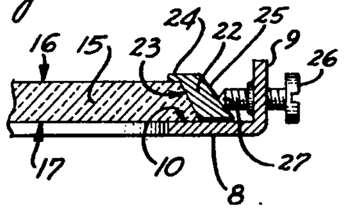
Figure 2 is a partial cross sectional view of the disc, disc holder, and adjustment means used in Figure 1.

As best shown in Figure 2, a circular glass scanning disc 15, having parallel upper and lower flat surfaces 16 and 17, is positioned on the metal member 8 with the lower flat surface 17 of the disc 15 resting on the flat mounting surface 10. The upper surface 16 of the disc 15 is provided with an opaque mask 20 having a transparent wedge 21 therein, the apex of the wedge forming the central control point for the star image.

The thickness of the disc 15 is such as to place the control point in the focal plane of the system, and for accurate sensing of the deviation of the image, the control point should be axactly centered in the axis of rotation of the motor rotor 5. The disc should, therefore, be readily laterally movable, without, however, departing from perpendicularity with the axis of motor rotor rotation.

Such adjustment is accomplished by making the periphery of the disc slope outwardly and downwardly, and by using a bezel ring 22 having an inner surface 23 fitting the angular periphery of the disc and an upper rim 24 fitting over the top surface 16 of the disc, as shown in Figure 2.

The outer surface 25 of the bezel ring 22, is also coned, perferably to make a 45° angle with the flat surface 10, of the metal member and the depth of the bezel ring 22 is such that it does not quite touch the flat surface 10.

A plurality of adjustment screws 26, usually three, are threaded into rim 9 of the metal member 8 and extend inwardly to terminate in tips 27 coned to 90°, so that when these tips bear against the outer bezel ring surface 25 the lower surfaces of these tips bear against the 45° angle thereof.

Due to the fact that the tip contact angle and the angle of the outer bezel surface 25 coincide, the bezel ring is forced downwardly during adjustment, and in consequence the disc is firmly seated at all times while being moved laterally.

Very accurate centering can be accomplished with the device just above described, and the disc will at all times maintain the desired perpendicularity with the axis of rotation.

While I have described my invention as being particularly adapted to the centering of a scanning disc in an optical system, it will be apparent to those skilled in the art that my invention can be applied to the accurate centering of other optical elements where strict perpendicularity to a known axis is required during and after adjustment.

It is also to be understood that the present invention can equally well be utilized to hold a reflective scanning disc where the disc surfaces are at an angle to the axis of the optical system.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed is:

In an optical instrument having an optical axis and a circular optical element to be held at a predetermined angle with said axis; means for adjusting said element in said plane which comprises a flat element surface on said optical element, an element support member having a flat member surface at said predetermined angle to said axis in contact with said element surface, an outer sloping surface provided around the edge of said element, said sloping surface diverging in the direction of said member surface, a bezel ring having an inner surface fitting said outer sloping surface, and an annular portion extending over and resting on the upper surface of said element only adjacent the periphery thereof, the depth of said bezel ring being less than required to contact said flat member surface, said ring also having an exterior sloping surface diverging in the direction of said member surface, and screw means positioned to push inwardly on said latter sloping surface at a plurality of peripheral positions thereof, said screw means contacting said latter sloping surface to give said optical element through said bezel ring a component of force in the direction of said member surface, whereby said element is maintained firmly in contact with said member surface at said predetermined angle regardless of adjustment in said plane, the ends of said screw means being coned to the same angle as the angle of the latter sloping surface contacted thereby.

References Cited in the file of this patent

UNITED STATES PATENTS 1,226,026 Stout ------------------ May 15, 1917

FOREIGN PATENTS 285,426 Germany --------------- June 30, 1915